July 11, 1961 B. B. STEELE ET AL 2,991,880
SPOOLING GAUGE AND REJECT UNIT
Filed June 22, 1955 6 Sheets-Sheet 3

Bruce B. Steele
Philip J. Warner
INVENTORS
Daniel I. Mayne
BY
J. Griffin Little
ATTORNEYS United States Patent Office 2,991,880
Patented July 11, 1961

2,991,880
SPOOLING GAUGE AND REJECT UNIT
Bruce B. Steele and Philip J. Warner, Rochester, N.Y., assignors to Eastman Kodak Company, Rochester, N.Y., a corporation of New Jersey
Filed June 22, 1955, Ser. No. 517,122
8 Claims. (Cl. 209—73)

The present invention relates to a spool inspection mechanism, and more particularly to a gauging and rejection unit to detect spools with defective flanges, and to reject such defective spools before the latter have film wound thereon. As is well known, spools for use with roll film must meet certain rigid requirements as to size and spacing of the flanges. Also, the flanges should not be warped or distorted. On the contrary, all parts of a flange should lie substantially in a plane or within certain acceptable tolerance limits, all of which is well known to those in the art.

The present invention has as its principal object the provision of a novel spooling gauge and reject unit for use with roll film spools.

Another object of the invention is the provision of such a unit which accurately detects defects in spool flanges.

Still another object of the invention is the provision of a novel spool supply means to supply spools in a definite relation to the gauging and reject unit.

And yet another object of the invention is the provision of a novel defective spool ejecting mechanism.

And yet another object of the invention is the provision of such a unit adapted for use with film spools of different sizes.

To these and other ends the invention resides in certain improvements and combinations of parts, all as will be hereinafter more fully described, the novel features being pointed out in the claims at the end of the specification.

In the drawings.

Similar reference numerals throughout the different views indicate the same parts.

Figure 1:
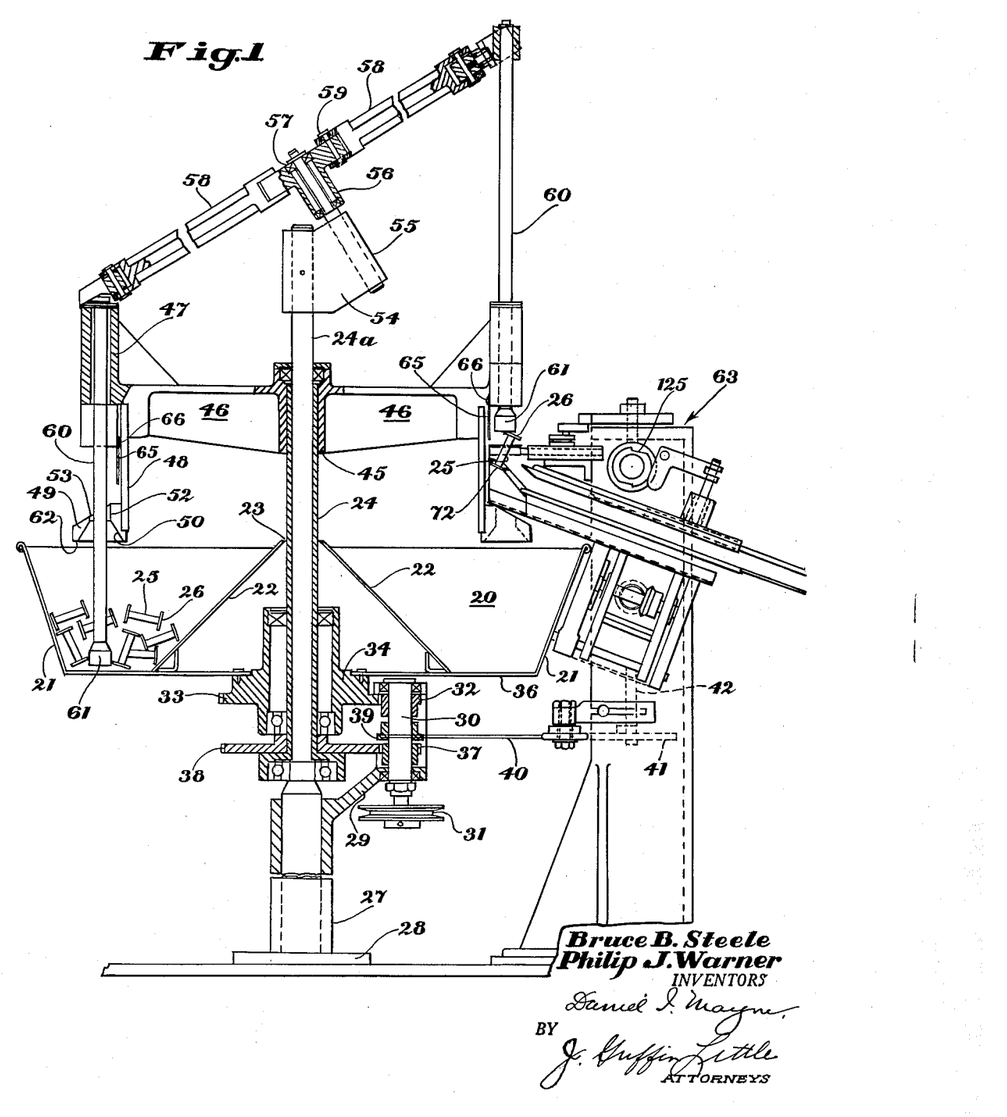
FIG. 1 is a side elevation of the spool hopper and the unit of the present invention, the parts being in section, and showing the drive means between the spool hopper and the gauging and reject unit.

FIG. 1 shows a spool hopper 20 which is annular in shape and provided with inner and outer sloping sides 22 and 21, respectively. The center of the hopper is formed with an opening 23 through which a main tubular drive shaft 24 extends, as clearly illustrated in FIG. 1. A solid supporting post 24a is positioned within shaft 24. The hopper is adapted to have positioned therein a supply of metal film spools each spool having a center core 25 and end flanges 26 positioned at opposite ends of and normal to the core 25, as is well known. The lower end of post 24a is fixedly supported in a sleeve 27 integral with a base or support 28. The sleeve is provided with a laterally extending bracket 29 which carries a drive shaft 30 the lower end of which has mounted thereon a pulley 31 which may be connected by a belt or chain, not shown, to a suitable source of power, also not shown. The shaft 30 carries a gear 32 which meshes with a gear 33 carried by a sleeve 34 rotatably mounted on shaft 24. The sleeve 34 is connected by bolts or other suitable fastening means to the bottom 36 of the hopper 20. Thus, rotation of shaft 30 will serve to rotate the hopper 20. Shaft 30 has a second gear 37 which meshes with the gear 38 secured to the shaft 24 so as to rotate the latter upon rotation of shaft 30. Thus, both the hopper 20 and shaft 24 are connected to and rotate with shaft 30, as is deemed apparent from an inspection of FIG. 1. However, there is a one-tooth differential between gears 33 and 38 to enable a magnet 61, to be later described, to work progressively over the spools within the hopper 20. The shaft 30 has mounted thereon, between gears 32 and 37, a sprocket 39 which is connected by a chain or belt 40 to sprocket 41 on the lower end of an auxiliary shaft 42, the purpose of which will be later pointed out.

As mentioned above, shaft 24 extends upward through opening 23 of hopper 20 to a point above the latter, and has mounted thereon a sleeve or spider 45 formed with a plurality of, in the present instance four, radially extending arms 46 the ends of which have mounted thereon upwardly extending tubular guides 47. The ends of arms 46 also carry depending supports 48 the lower ends of which have mounted thereon positioning members 49 having a countersunk lower opening 50 with tapered sides which terminate in straight sides 52 of a vertical opening 53. The purpose of this arrangement will be later pointed out.

The upper end of post 24a has mounted thereon a bracket 54 the outer end of which carries an inclined shaft 55 on which is mounted a bearing 57 of a spider 56 provided with four radially extending arms 58. In the present instance there are four arms 58 corresponding to four arms 46. To maintain the parallelism of rods 60 one of the arms 58 is fixed to spider 56, while the other three arms 58 are mounted for slight rockable movement in the plane of the arms. To secure this result, the movable arms are connected to spider 56 by a pin connection 59, as shown in FIG. 1. The ends of the arms 58 have depending therefrom rods 60 each of which passes through and is guided in an aligned support 47 and openings 50 and 53 of a positioning member 49 so as to maintain the rod 60 in a vertical position at all times, as is deemed apparent from an inspection of FIG.

1. It will be apparent from an inspection of FIG. 1 that due to the inclination of the arms 58, when an arm is in the position at the left, the rod 60 will be in its lowermost position and will pass through the left supporting guide 47 and the left positioning member 49. As shaft 24 and arms 46 carried thereby are rotated, spider 56 is likewise caused to rotate as previously described. Due to the inclination of spider 56, the rotation thereof causes each rod 60 to reciprocate between a lower position as shown at the left side of FIG. 1 and a raised position as shown toward the right side of FIG. 1 as the rod is revolved about post 24a. As noted in FIG. 1, the rods 60, carrying the magnets 61, extend through the guides 47, which, in turn, are carried by the lower spider 45. Now, when the latter is rotated by shaft 24, the guides 47 engage rods 60 to rotate the upper spider 56 as a unit with the lower spider 45.

The lower end of each rod 60 is provided with a magnet 61. The result is that when the rod 60 is in the left position, FIG. 1, the magnet 61 is positioned within the spool hopper 20, and as the spools are of metal, one or more of the spools will be attracted to and will cling to the magnet 61. These spools may be connected to the magnet in a number of haphazard positions, such as in aligned, partly aligned with, or in crosswise relation to the rod 60. Now, as the spider 56 rotates, the left rod 60 and its magnet 61 will be lifted gradually from the hopper and will carry the attached spools upward. As the magnet 61 approaches the positioning member 49, any spools which are attached crosswise or are out of alignment with rod 60 will finally engage the lower surface 62 of the member 49 as the rod 60 and magnet 61 continue to be lifted through the member 49. The non-aligned spools will be detached or stripped off the magnet by surface 62. It may happen that in some cases the spools are so arranged relative to the magnet that all the spools will be stripped therefrom. However, if a spool is in general alignment with the rod 60 as the latter is moved upward, the spool flanges will engage first the inclined sides of the opening 50 and will finally engage the straight sides 52 of the opening 53, gradually to bring the spool into general or substantial alignment with the rod 60 and magnet 61, as illustrated at the right of FIG. 1.

Thus, the upward moving of the rod 60 and magnet 61 will lift a spool out of the bin or hopper 20, and if the spool is more or less vertical, the spool will be gradually brought into substantial alignment with the rod 60 and magnet 61. If the spool is not in such general alignment, it will be stripped off of the magnet before the latter passes through positioning member 47. While each magnet may not lift a spool, it has been found that sufficient spools will be lifted to supply the gauging and reject unit broadly designated by the numeral 63, FIG. 1, and later to be more fully described. The unit 63 is carried on the support 64. The guides 47 maintain the rods 60 and magnet 61 in vertical relation irrespective of the vertical position of the rod and magnet.

As the spider 56 is rotated, the rod 60 and magnet 61 with its attached and substantially aligned depending spool will be carried to the right. Such movement will cause the magnet to move over a pair of strip members 70 and 71 carried by the unit 63. The member 70 is stationary on the unit while the member 71 is movable relative thereto for a purpose to be later described. As the spool is moved toward the unit 63, the lower depending spool flange 72 will finally be brought into engagement with a vertical surface 73 of a bracket 74 of the unit 63. Upon such engagement a further rotation of the spider 56 will cause the spool to rock clockwise, FIG. 2, about the lower flange 72. Finally, the spool will be rocked to a point at which the core 25 will engage the surface 73 and rocking continues until the core finally reaches a horizontal position between the stripping members 70 and 71. At that time the flange 72 of the spool finally engages the surfaces 75 and 76 of the members 70 and 71, respectively, and the spool is stripped off the magnet 61 and is positioned in the space 77 between members 70 and 71, as shown in FIGS. 3 and 4. It will be noted from this figure that the width of the space 77 is slightly less than the diameter of the spool core 25 so that the spool is held in the space 77 against further movement. The reason for this is to insure that the spool will be in proper position and will not be tilted or cocked as it is passed to the gauging device, broadly designated by the numeral 78, FIG. 8.

As the lower spool flange 72 strikes the surface 73, the spool might be jarred or moved out of proper relation with the magnet 61 so that the spool will not be arranged in proper relation on the unit 63 and the stripping members 70 and 71. To prevent spools from "bouncing and hanging" to the magnet arm after normal stripping action, there is a strip 65 of heavy leather attached to each guide 47; whenever a "hanging" spool contacts the leather strip it is forced off the magnet. Any tendency of the spool to be jarred from the magnet will cause the spool to contact lightly the strip 65, and the latter will retain the spool in proper relation on the magnet so that the latter can deliver the spool core between the stripping members 70 and 71.

Figure 2:
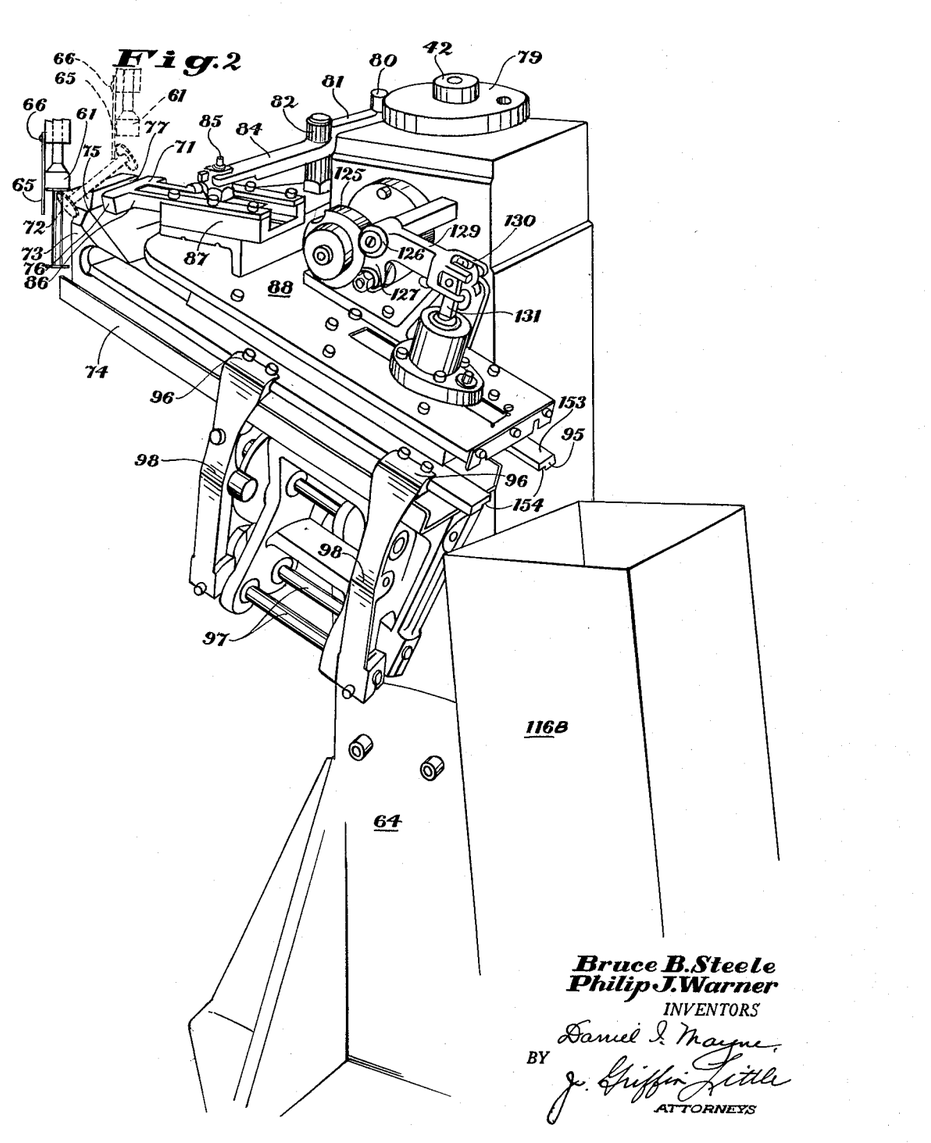
FIG. 2 is a perspective view of the spool gauging and reject unit separate from the spool supply hopper, showing the relation of the various parts of the unit.
Figure 3:
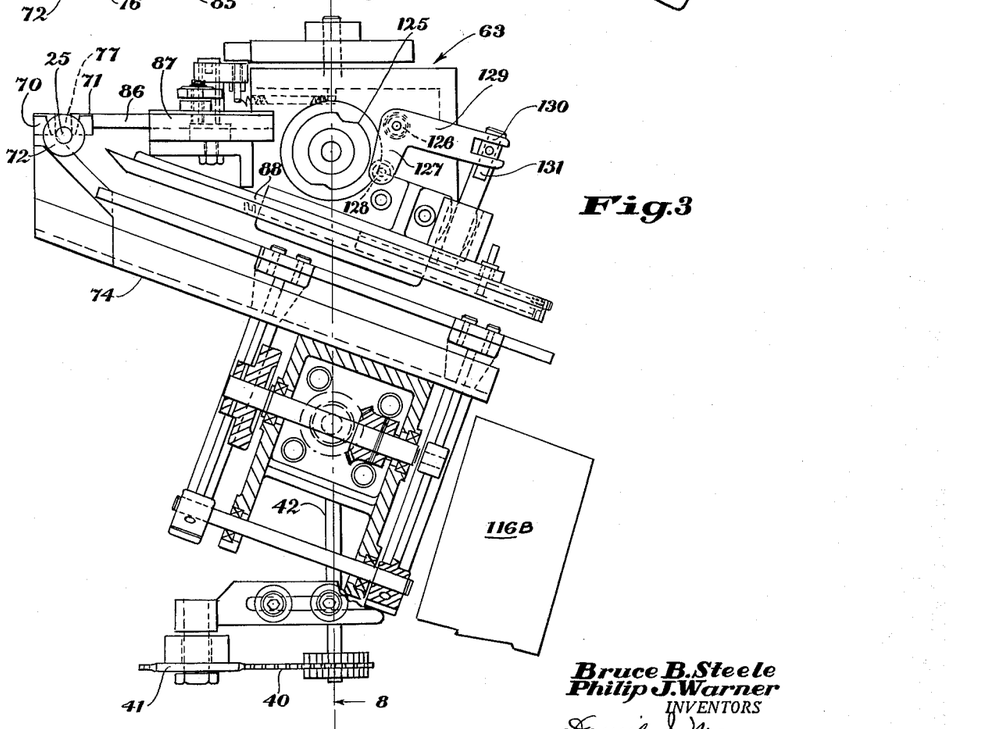
FIG. 3 is a side elevation view of the unit illustrated in FIG. 2, with parts in section to illustrate the track moving means.
Figures 4, 5:
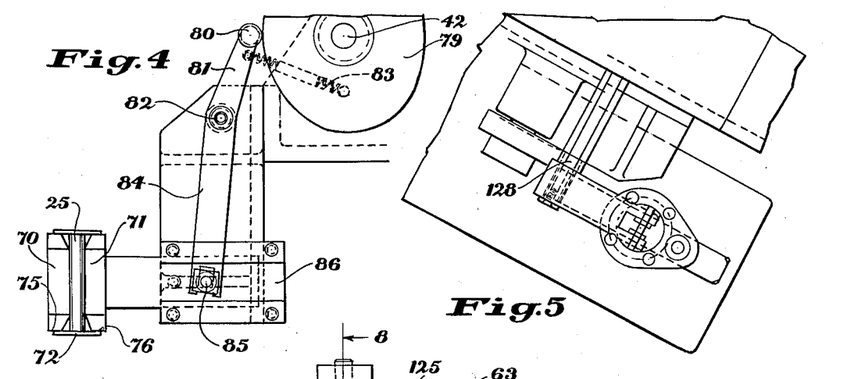
FIG. 4 is a partial plan view of the mechanism illustrated in FIG. 3, showing the relation of the spool stripping members, and the means for actuating the movable stripping member.
FIG. 5 is a partial plan view of the mechanism illustrated in FIG. 3 showing the mechanism for operating the auxiliary ejector.

After the spool has been positioned in the space 77, the movable stripping member 71 is moved to the right, as viewed in FIGS. 2, 3 and 4, to increase the width of the space 77 to free the spool. To secure this result, the shaft 42 has mounted on the upper end thereof a cam 79 which engages a cam follower 80, see FIGS. 2 and 4, secured to the outer end of the arm 81 of a bell crank pivoted at 82 to the support 64. A coil spring 83 has one end anchored to support 64 and the other end connected to the arm 81 to hold the follower 80 in positive contact with the cam 79, as shown in FIG. 4. The other arm 84 of the bell crank is pivoted at 85 to a slide 86 which is slidable in a guideway 87 carried by a plate 88 connected to support 64. The left end of the slide 86 carries a movable stripping member 71, as best shown in FIGS. 2, 3 and 4. It will thus be apparent that rotation of shaft 42 and cam 79 will rock the bell crank counter clockwise about pivot 82, as viewed in FIG. 2, to move the movable stripping member 71 to the right or away from the stationary member 70 to increase the space 77 to free the spool. As the shaft 42 is connected to the shaft 24, as above described, the member 71 will be moved in proper and timed relation to the rotation of the spider 56 for supplying the spools to the unit 63.

Figure 6:
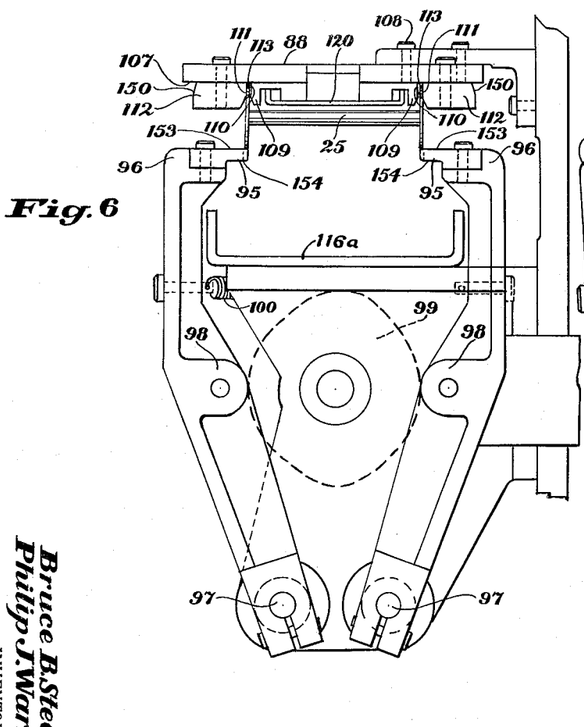
FIG. 6 is a right hand view of the unit illustrated in FIG. 2 showing the spool supporting tracks in supporting position.
Figure 7:
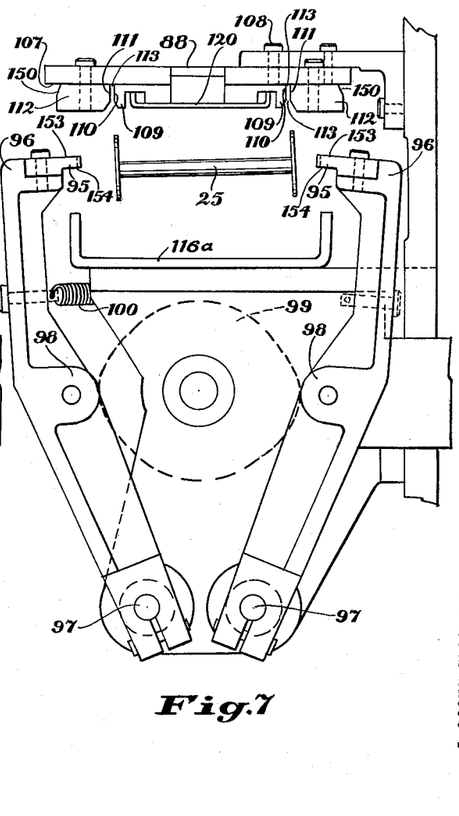
FIG. 7 is a view similar to FIG. 6, but with the tracks in open non-supporting position to allowing dropping out or ejection of a defective spool.

When the spool is freed, it will roll downward to the right, as viewed in FIG. 2, along a pair of spaced tracks 95 which are spaced to receive and support the spool flanges 26, as best shown in FIG. 6. These tracks are carried by a pair of arms 96, of the shape best shown in FIGS. 6 and 7, each of which is pivoted at 97 at its lower end. Intermediate the tracks 95 and the pivot point 97, each arm 96 is provided with a cam follower 98 which is held in positive engagement with a cam 99 by a coil spring 100, the opposite ends of which are connected to arms 96 above the follower 98, as best shown in FIGS. 6 and 7. When the arms 96 are in the position shown in FIG. 6, the tracks are arranged under and support the flanges 26 of the spools. However, when the cam 99 is rotated to the position shown in FIG. 7, both arms 96 are rocked to the position shown in FIG. 7, increasing the spacing between tracks 95 to move the latter out of supporting relation with the spool flanges 26, as is deemed apparent from an inspection of FIG. 7.

In order that the opening or movement of the tracks 95 may be in proper timed relation to the other mechanisms, the movement is controlled from shaft 42 which is connected to and operated from shaft 30. To secure this result, shaft 42 has mounted thereon a bevel gear 101 which meshes with a bevel gear 102 carried by the right end of a horizontal shaft 103, see FIG. 8, the left end of which carries a bevel gear 104 which meshes with a similar gear 105 carried by a shaft 106 on which cam 99 is mounted. Thus, movement of tracks 95 is in timed relation with the feeding of the film spools.

Figure 11:
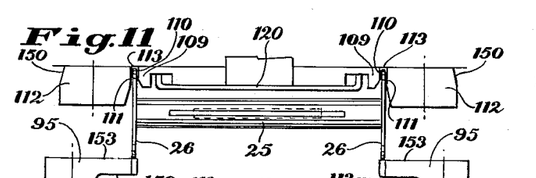
FIG. 11 is a partial view of the flange guide and supporting tracks of FIG. 10 positioned as in FIGS. 5 and 6 to operate with a "620" spool.
Figure 12:
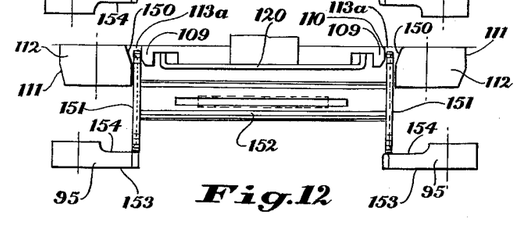
FIG. 12 is a view similar to FIG. 11 and with the flange guide and supporting tracks arranged as in FIG. 10 to operate with a "120" spool.

The plate 88 which supports the guideway 87 has secured to the under side 107 thereof by bolts 108, or other suitable fastening means, a pair of inner gauge members 109, the outer vertical surfaces 110 of which are spaced from the inner surface 111 of a pair of outer gauge members 112 to provide a pair of spaced channels 113 adapted to receive the spool flanges 26. Each of the members 112 is provided with a central opening 116 to receive a bolt 117 to hold member 112 to plate 88. The lower edges of the surfaces 110 are tapered inwardly while the lower edges of the surfaces 111 are tapered outwardly as best shown in FIGS. 11 and 12. The channels 113 have a width such as to permit the free passage therethrough of flanges 26 which are satisfactory or which have defects which come within acceptable tolerance limits. Thus, channels 113 cooperate with tracks 95 to guide the spool downward to the right. If the spool flanges are satisfactory the spool will roll freely along tracks 95 and through channels 113, and will be discharged from the right end of unit 63 to a spooling machine which is not shown and which forms no part of the present invention. The surfaces 110 and 111 are equally spaced for the greater portions of their length to provide channels 113 with constant width. However, to facilitate ready entrance of the flanges 26 into the channels 113, surfaces 110, for a short distance adjacent the stripping members 70 and 71 or to the left as viewed in FIG. 2, are inclined slightly or tapered towards each other to increase slightly the entrance end of the channels 113. Thus, if the spool is satisfactory it will move freely and quickly through the gauge and reject unit 63. It is sometimes found, however, that during manufacture or subsequent handling, the spool flanges 26 may be bent or distorted. If such bend or distortion is within acceptable tolerance limits, the spool flanges will still pass freely through channels 113. If, however, the defect is such as to be outside such tolerances, the spool flanges will roll down tracks 95 and will wedge or engage between the surfaces 110 and 111 and will not pass through channels 113; but, on the contrary, will be wedged therein and the degree of wedging will depend, of course, upon the amount of distortion or deformation of the flanges. Slight deformation will cause the flanges to wedge lightly against surfaces 110 and 111. Now when the arms 95 are subsequently moved to the position shown in FIG. 7 and the tracks are moved out of supporting relation with the spool flanges, if the latter are wedged lightly in the channels 113, the spool will drop out of the channels and into a reject ductway 116a, which will direct the defective spool to a suitable retainer or magazine, 116b. Thus, a slightly defective spool which is beyond the tolerance limits will bind slightly in channels 113, but will drop freely therefrom when the supporting tracks 95 are moved out of supporting relation, as is deemed apparent. Also, as the tracks 95 and arms 96 are moved in timed relation to the rotation of shaft 44 and the supplying of the spools, the ejection is in timed relation to the spool supplying mechanism.

It may happen, however, that the defect or deformation of the flanges 26 is such as to bind the spool flanges in the channels 113 with sufficient firmness that the defective spools will not drop out or be ejected freely when the tracks 95 are moved to non-supporting position, as shown in FIG. 7. Therefore, it is preferred to provide an auxiliary means to insure positive ejection of defective spools from the channels 113. To this end an ejector plate 120 is mounted below plate 88 and between the inner surfaces 110. The plate 120 has a width substantially equal to the length of the core 25 so that when the plate is lowered, by mechanism to be presently described, the plate 120 will positively engage the spool core and positively and effectively reject the flanges out of the channels 113 to eject or drop out the defective spool into the reject ductway 116a.

Figure 8:
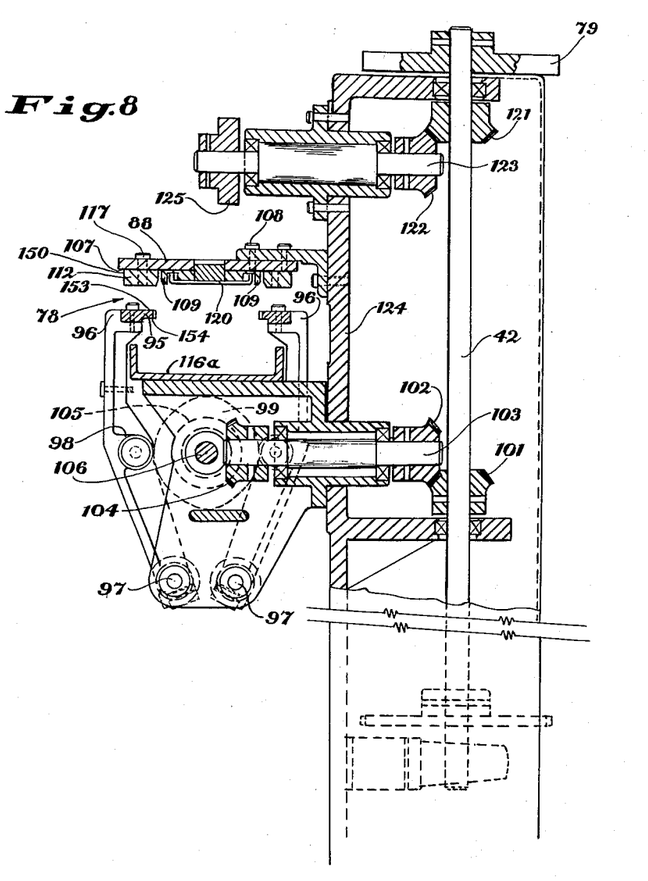
FIG. 8 is a vertical sectional view through the unit illustrated in FIG. 3 and taken substantially on lines 8—8 thereof, showing the relation of certain of the drive members.
Figure 9:
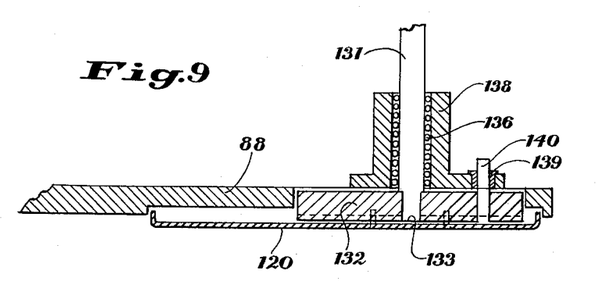
FIG. 9 is a vertical sectional view through an auxiliary ejector plate, showing the relation of the various parts.
Figure 10:
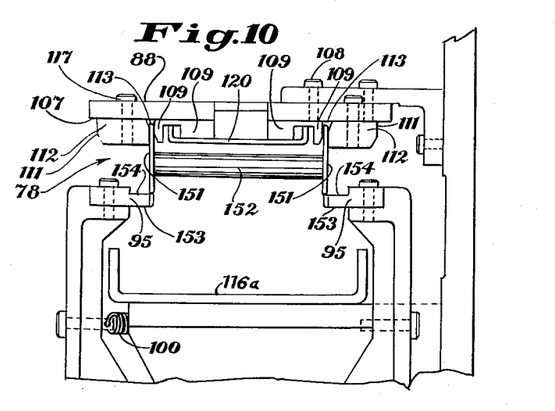
FIG. 10 is a partial end elevation of the mechanism illustrated in FIGS. 6 and 7, showing flange guides and supporting members positioned for another size of film spool.

To move the auxiliary ejector plate 120, the shaft 42, see FIG. 8, has mounted thereon a bevel gear 121 which engages a bevel gear 122 secured to the right end of a short or stub-shaft 123 to rotate the latter. The shaft 123, like shaft 103, is journaled in a vertical wall 124 of the support 64 and has mounted on the left end thereof a cam 125 positioned above plate 88 and slightly to the right of the guideway 87, as shown in FIGS. 1, 2 and 3. A bell crank lever is pivoted at 126 on wall 124, and has an arm 127 the free end of which carries a cam follower 128 held in engagement with the cam 125. The other arm 129 of the bell crank lever has a bifurcated end 130 which is connected pivotally to an operating arm or shaft 131 for plate 120. The latter is screwed or otherwise secured to an ejector mounting block 132 which is positioned between plates 88 and 120, as best shown in FIG. 9. The lower end 133 of arm 131 is reduced in size and pressed into an opening in the block 132. The arm 131 extends through plate 88 and through what is known as a "ball bushing" which comprises a series of balls 136 along which the arm 131 moves axially. The bushing is positioned in a housing 138 which is suitably secured to plate 88 and is provided with a bronze bushing 139 through which extends a dowel pin 140 secured to the mounting block 132. The housing 138 and bushing 139 are in alignment with arm 131 and dowel 140 and serve to absorb torque so that a spool wedged in the channels 113 can be pushed or ejected any place along plate 120. The purpose of the dowel 140 is to prevent the plate 120 and block 132 from rotating. In order to prevent possible breakage of the parts the plate 120 and its associated parts tend, when released by cam 125, to fall or move downward by their own weight ejecting a jammed spool flange. The result is that if the jamming is too severe no parts will be damaged as no force is applied to the plate 120 during the ejection operation. During such operation cam 125 is rotated by shaft 42 to free the plate 120 which moves downward due to its own weight, as mentioned above. This movement is in timed relation to the other operations. However, when the ejecting operation has been completed, a high point on cam 125 engages follower 128 to rock the bell crank counterclockwise, as viewed in FIG. 2, to lift plate 120 and its associated parts to an elevated or inoperative position.

The inner and outer guide members 109 and 112, respectively, and the supporting tracks 95 are adapted, as shown in FIGS. 6, 7, 8 and 11, for use with spools on which a number 620 film is wound, and such spools are known as "620" spools. However, the unit 63 is also adapted for use with "120" spools on which "120" film is wound, as shown in FIG. 12.

Figure 13:
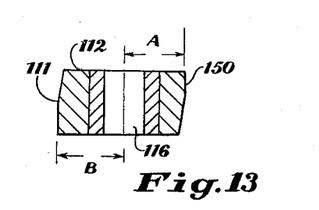
FIG. 13 is a sectional view through one of the outer gauge members, showing the relation of the opposite side edges thereof.

To secure this result, the outer gauge members 112, FIG. 11 are turned over in the same positions and surfaces 111 are at the outside in FIG. 12, with surfaces 150 being placed inside to form guide channels 113a which will receive the thicker flanges 151 of the "120" spools, the flanges 151 being connected by a core 152, as shown in FIG. 12. Furthermore, as seen in FIG. 11 the flanges 26 of the "620" spool are supported on surfaces 153 of the tracks 95. However, in order to accommodate the number "120" spool, FIG. 12, the tracks 95 are switched from right to left and turned over so that the surfaces 154 thereof are now uppermost, FIG. 12, and support the flanges 151 of the "120" spool. Thus, merely by reversing the outer gauge members 112 and the tracks 95, the device 63 can be readily and easily adapted for use with either 620 or 120 film spools. FIG. 13 shows details of the right outer guide 112. In FIG. 11 it is arranged for a "620" spool. When this right hand guide member 112 of FIG. 11 is positioned in FIG. 12 for a 120 spool, the guide will be on the left. It will be noted that the distances A and B, FIG. 13, on the guide 112 are different so that when the guides 112 are reversed from the positions shown in FIG. 11 to that shown in FIG. 12, space is gained to allow for the "120" spool which has thicker flanges 151 which are thicker than the flanges 26 of the "620" spool.

The present invention thus relates to the combination of a spool supplying mechanism and a spool gauge and reject unit. The spools are supplied to the unit individually by a novel form of spool feeding and supplying mechanism which also cooperates with the unit to position the spool in proper relation thereon. The gauging and reject unit easily, quickly and automatically separates spools having defective flanges, and drops out or rejects such defective spools from the unit, so as to prevent such defective spools being fed or supplied to the film spooling machine, the advantage of which are deemed apparent.

While one embodiment of the invention has been disclosed, it is apparent that the inventive idea may be carried out in a number of ways. Therefore, this application is not to be restricted to the specific mechanisms shown, but is intended to cover all variations and modifications which fall within the scope of the appended claims.

What we claim and desire to secure by Letters Patent of the United States is:

1. A spool gauging and reject unit comprising, in combination, a spool receiving station, a stationary and a movable member at said station engaging said spool to position the latter relative to said unit, a pair of tracks extending downwardly from said station, means to move said movable member to release said spool at said station to allow the spool flanges to engage and roll down said tracks so that the latter will support said flanges, a gauging unit associated with said tracks and formed with spaced guides to provide channels through which the flanges move while the latter are supported by said tracks, said guides engaging defective flanges to prevent the free movement of the defective flanges through said channel, and means to move said tracks out of supporting relation with said defective flanges to eject spools with defective flanges from said unit.

2. A spool gauging and reject unit comprising, in combination, a spool receiving station, means at said station to position a spool, a pair of downwardly inclined tracks to support spool flanges and along which the flanges roll, a gauging unit positioned above said tracks and formed with a pair of spaced channels through which the flanges move while rolling down said tracks, a spool with acceptable flanges moving freely through said channels but defective flanges binding in said channel to delay the movement of said spool, means for moving the tracks out of supporting relation to permit spools having flanges binding in said channels to be ejected from said unit, and means to return the tracks to supporting position after the defective spool has been ejected.

3. A spool gauging and reject unit comprising, in combination, a spool receiving station, a stationary and a movable member at said station engaging said spool to position the latter relative to said unit, a pair of tracks extending downwardly from said station, means to move said movable member to release said spool at said station to allow the spool flanges to engage and roll down said tracks so that the latter will support said flanges, a gauging unit associated with said tracks and formed with spaced guides to provide channels through which the flanges move while the latter are supported by said tracks, said channels permitting the free and unobstructed movement of acceptable flanges therethrough but preventing the free passage of defective spools which bind in said channels, means to move said tracks out of supporting relation with said flanges to permit flanges which bind lightly to disengage from said channels to eject spools with defective flanges from said unit, and auxiliary means positively engaging spools which bind more firmly in said channels to strip said flanges from said channels to eject the spool from said unit, and means to return the tracks to their supporting relation after a defective spool has been ejected from the unit.

4. A spool gauging and reject unit comprising, in combination, a spool receiving station, a stationary and a movable member at said station engaging said spool to position the latter relative to said unit, a pair of tracks extending downwardly from said station, means to move said movable member to release said spool at said station to allow the spool flanges to engage and roll down said tracks so that the latter will support said flanges, a gauging unit positioned above said tracks formed with spaced adjustable guides to provide channels through which the flanges move while supported by said tracks, said channels permitting the free and unobstructed movement of acceptable flanges therethrough but preventing the free passage of defective spools which bind in said channels, means to move said tracks out of supporting relation with said flanges to permit flanges which bind lightly to disengage from said channels to eject spools with defective flanges from said unit, auxiliary means positively engaging spools which bind more firmly in said channels to strip said flanges from said channels to eject the spool from said unit, and means to return the tracks to their supporting relation after a defective spool has been ejected from the unit, said guides and tracks being adjustable to adapt said unit for spools of different sizes.

5. In a mechanism for supplying spools individually from a random supply to a point of disposal in a given orientation, the combination of a spool hopper adapted to contain a random supply of spools having metal flanges; a rotatable shaft; a member fixed to and rotatable with said shaft; a plurality of sleeve guides fixed to said member in spaced relation to be moved by rotation of said member between a point of pickup relative to the hopper and said point of disposal; a magnetic element slidably mounted in each of said sleeve guides to move between a lowered position wherein it extends into said hopper at the pickup point to pick up a spool by magnetic attraction and a raised position, wherein it carries the spool picked up from the hopper to said point of disposal, and means for successively moving said magnetic element between said two positions as the member rotates them between said pick up point in the hopper and said point of disposal and including a rotatable spider having a plurality of radially extending arms, a pivotal connection between one end of each magnetic element and one of said arms, means for rotatably mounting said spider with its plane of rotation inclined to the axis of said sleeve guides, means for rotating said member and spider in synchronism, and means at said point of disposal for stripping a spool from each magnetic element as it reaches said point.

6. In a mechanism for supplying spools individually from a random supply to a point of disposal in a given orientation, according to claim 5, and including a spool positioning member fixed to said rotatable member and embracing each magnetic element for stripping all but one spool from said magnetic element and orienting said one spool relative to said element during the movement of said element from its lowered position.

7. In a machine for gauging the parallelism, roundness, and spacing of flanges on metal spools, the combination comprising: a plurality of flange gauging members disposed to allow a spool deposited in supported rolling relation therewith and having substantially round and mutually parallel coaxial flanges spaced by a predetermined distance to roll along said members, and to seize any other spool so deposited; means including a movable element having a permanent magnet thereon for removing a single spool from a plurality of randomly oriented spools and for magnetically attaching said spool to said movable element in a particular orientational relation therewith; means for moving said element and thereby the spool attached thereto through a predetermined path; means disposed in the path of said spool and adapted to engage and strip the spool off of the movable element as a result of the movement of said element, and to deposit the spool in said supported rolling relation with said flange gauging members; and means for removing from said flange gauging members a spool seized thereby.

8. In a machine for gauging the parallelism, roundness, and spacing of flanges on metal spools, the combination comprising: a plurality of flange gauging members disposed to allow a spool deposited in supported rolling relation therewith and having substantially round and mutually parallel coaxial flanges spaced by a predetermined distance to roll therealong, and to seize any other spool so deposited; means including a vertically disposed movable rod having a permanent magnet at the lower end thereof for removing a single spool from a plurality of randomly oriented spools and for attaching the spool to said magnet in coaxial relation to said rod; a mechanism for moving said rod and thereby said spool through a predetermined path; spool receiving means located in the path of movement of the spool and operable upon engagement of such moving spool therewith, and as a result of such spool movement, to strip the spool from said magnet and to receive the spool in a substantially horizontal position, said spool receiving means having a first state in which a spool so received is retained therein in such position and a second state in which a spool so retained is deposited in said supported rolling relation with said flange gauging members; a mechanism for changing the state of said spool receiving means; a spool ejecting mechanism for moving at least one of said flange gauging members to eject a spool seized by said members; and control means so interconnecting said mechanisms that a spool is received in said spool receiving means only when said spool receiving means is in said first state and said spool ejecting mechanism functions only when said spool receiving means is in said first state.

References Cited in the file of this patent

UNITED STATES PATENTS

| | | |
|---|---|---|
| 938,235 | Hermann | Oct. 26, 1909 |
| 1,867,054 | Bower | July 12, 1932 |
| 1,886,047 | Ritscher | Nov. 1, 1932 |
| 1,952,777 | Raymond | Mar. 27, 1934 |
| 2,331,422 | Reynolds | Oct. 12, 1943 |
| 2,336,582 | Willens | Dec. 14, 1943 |
| 2,356,295 | Yost | Aug. 22, 1944 |
| 2,364,187 | Birdsall | Dec. 5, 1944 |
| 2,400,507 | Henszey et al. | May 21, 1946 |
| 2,660,304 | Box et al. | Nov. 24, 1953 |
| 2,683,618 | Long | July 13, 1954 |
| 2,733,824 | Ruppe | Feb. 7, 1956 |
| 2,738,066 | Gueffroy | Mar. 13, 1956 |
| 2,869,756 | Farnsworth | Jan. 20, 1959 |